US 9,265,031 B2

(12) United States Patent
McHardy et al.

(10) Patent No.: US 9,265,031 B2
(45) Date of Patent: Feb. 16, 2016

(54) COMMUNICATION PROTOCOL FOR SHORT DATA TRANSMISSIONS

(71) Applicant: Optis Cellular Technology, LLC, Plano, TX (US)

(72) Inventors: Geoffrey McHardy, Carp (CA); Stefan F. Tjärnlund, Järfälla (SE)

(73) Assignee: Optis Cellular Technology, LLC, Plano, TX (US)

( * ) Notice: Subject to any disclaimer, the term of this patent is extended or adjusted under 35 U.S.C. 154(b) by 152 days.

(21) Appl. No.: 13/722,298

(22) Filed: Dec. 20, 2012

(65) Prior Publication Data

US 2014/0177534 A1  Jun. 26, 2014

(51) Int. Cl.
| | |
|---|---|
| *H04J 3/24* | (2006.01) |
| *H04L 12/66* | (2006.01) |
| *H04L 12/28* | (2006.01) |
| *H04W 72/04* | (2009.01) |
| *H04W 28/06* | (2009.01) |
| *H04W 76/02* | (2009.01) |
| *H04W 74/08* | (2009.01) |
| *H04W 88/02* | (2009.01) |
| *H04W 88/08* | (2009.01) |
| *H04W 4/00* | (2009.01) |

(52) U.S. Cl.
CPC .............. *H04W 72/04* (2013.01); *H04W 28/06* (2013.01); *H04W 76/021* (2013.01); *H04W 4/005* (2013.01); *H04W 74/0833* (2013.01); *H04W 88/02* (2013.01); *H04W 88/08* (2013.01)

(58) Field of Classification Search
USPC .......... 370/355, 389, 392, 470–472, 474–476
See application file for complete search history.

(56) References Cited

U.S. PATENT DOCUMENTS

| | | | |
|---|---|---|---|
| 2010/0309881 A1* | 12/2010 | Kim et al. ...................... | 370/331 |
| 2012/0207113 A1* | 8/2012 | Yoon et al. ..................... | 370/329 |
| 2012/0281658 A1* | 11/2012 | Rikkinen et al. ............... | 370/329 |
| 2013/0040678 A1* | 2/2013 | Lee et al. ....................... | 455/509 |
| 2013/0336305 A1* | 12/2013 | Yan et al. ....................... | 370/338 |
| 2014/0003357 A1* | 1/2014 | Ejzak et al. .................... | 370/329 |

FOREIGN PATENT DOCUMENTS

| | | |
|---|---|---|
| EP | 2154927 A1 | 2/2010 |
| WO | 2010/107357 | 9/2010 |

OTHER PUBLICATIONS

International Search Report for PCT/IB2013/061159 dated Aug. 20, 2014, 8 pgs.

* cited by examiner

*Primary Examiner* — Redentor Pasia

(57) ABSTRACT

A lightweight communication protocol reduces overhead for small data transmissions from a wireless device to a base station over an uplink channel. The wireless device is preconfigured with a device identifier that is known to the base station. The preconfigured device identifier is associated with a static tunnel between the base station and a serving gateway. The wireless device transmits application data to the base station in a medium access control packet without using higher layer protocols. When the base station receives the medium access control packet, it maps the application data to the tunnel associated with the preconfigured device identifier.

24 Claims, 9 Drawing Sheets

COMMUNICATION PROTOCOL FOR SHORT DATA TRANSMISSIONS

TECHNICAL FIELD

The present invention relates generally to data transmission in a wireless communication network and, more particularly, to methods and apparatus for low overhead data transmission in a wireless communication network for short data transmissions.

BACKGROUND

Machine-to-machine (M2M) communications, also known as machine-type communications (MTC), is the communication between devices without human involvement. Wireless communication networks are increasingly being used for M2M communications. For example, wireless devices are now being used in metering applications to report usage of utilities such as power and gas, in sensor networks, to collect data from sensors, and for location fleet tracking applications. It is expected that in the near future, the demand for M2M communications will surpass normal human-to-human (H2H) communications.

The Long Term Evolution (LTE) network and other broadband networks currently being deployed were designed to support high rate data services such as media streaming. The signaling overhead required to establish and maintain a communication session is high, and for high data rate applications the signaling overhead represents only a small portion of the total data being transmitted over the network. In typical M2M applications, the signaling overhead can be prohibitive because in typical M2M communications data transmissions are infrequent and comprise only a small amount of data. For example, in metering applications, the wireless device may transmit the current meter reading only once per month. In this case, the signaling to establish the communication link may exceed the amount of user data that is transmitted. As the number of M2M devices increases, more and more resources will need to be allocated to signaling overhead in order to avoid congestion, which means that fewer resources will be available for transmission of user data.

Further, the service profile for M2M may require only periodic, asynchronous, and unreliable data transmission. Many of the protocols used for high data rate transmissions are not necessary to meet the service requirements for M2M communications. The unnecessary protocols increase the complexity and cost of wireless devices used for M2M communications.

SUMMARY

The present invention provides a lightweight communication protocol for short data transmissions from a wireless device to a base station. The wireless device is preconfigured with a device identifier that is known to the base station. The preconfigured device identifier is associated with a static tunnel between the base station and a serving gateway. The wireless device transmits application data to the base station in a medium access control packet without using higher layer protocols. When the base station receives the medium access control packet, it maps the application data to the tunnel associated with the preconfigured device identifier. The lightweight communication protocol eliminates a majority of the overhead normally required for uplink transmissions and is therefore suitable for M2M communications in which data transmissions are infrequent and comprise small amounts of data in each transmission Exemplary embodiments of the invention comprise methods implemented by a base station in a wireless communication network for supporting small data transmissions by a wireless device over an uplink channel. One exemplary method comprises associating a preconfigured device identifier for a wireless device with a tunnel between the base station and a serving gateway; receiving a medium access control packet from the wireless device over a wireless communication channel, said medium access control packet including application data transmitted by the wireless device for delivery to a destination device; mapping the preconfigured device identifier of the wireless device to the associated tunnel; and forwarding said application data to said serving gateway through said tunnel.

Other embodiments of the invention comprise a base station in a wireless communication network for supporting asynchronous small data transmissions by a wireless device. One exemplary base station comprises a transceiver circuit configured to transmit and receive signals over a wireless communication channel, and a processing circuit coupled to said transceiver circuit. The processing circuit is configured to associate a preconfigured device identifier for a wireless device with a tunnel between the base station and a serving gateway; receive a medium access control packet from the wireless device over a wireless communication channel, said medium access control packet including application data transmitted by the wireless device for delivery to a destination device; map the preconfigured device identifier of the wireless device to the associated tunnel; and forward said application data to said serving gateway through said tunnel.

Other embodiments of the invention comprise methods implemented by a wireless device in a wireless communication network for transmitting data on an uplink channel to a base station. One exemplary method comprises generating a medium access control packet including a preconfigured device identifier that is reserved for asynchronous small data transmissions and application data; and transmitting the medium access control packet without higher layer protocol headers over a wireless communication channel to a serving base station.

Other embodiments of the invention comprise a wireless device in a wireless communication network. An exemplary wireless device comprises a transceiver circuit configured to transmit and receive signals over a wireless communication channel, and a processing circuit coupled to said transceiver circuit. The processing circuit is configured to generate a medium access control packet including a preconfigured device identifier that is reserved for asynchronous small data transmissions and application data; and to transmit the medium access control packet without higher layer protocol headers over a wireless communication channel to a serving base station.

The present invention reduces the amount of overhead required for short data transmissions. By eliminating unnecessary protocols form the data path for M2M communications, the complexity and cost of wireless device designated for M2M communications can be reduced.

DETAILED DESCRIPTION

Figure 1:
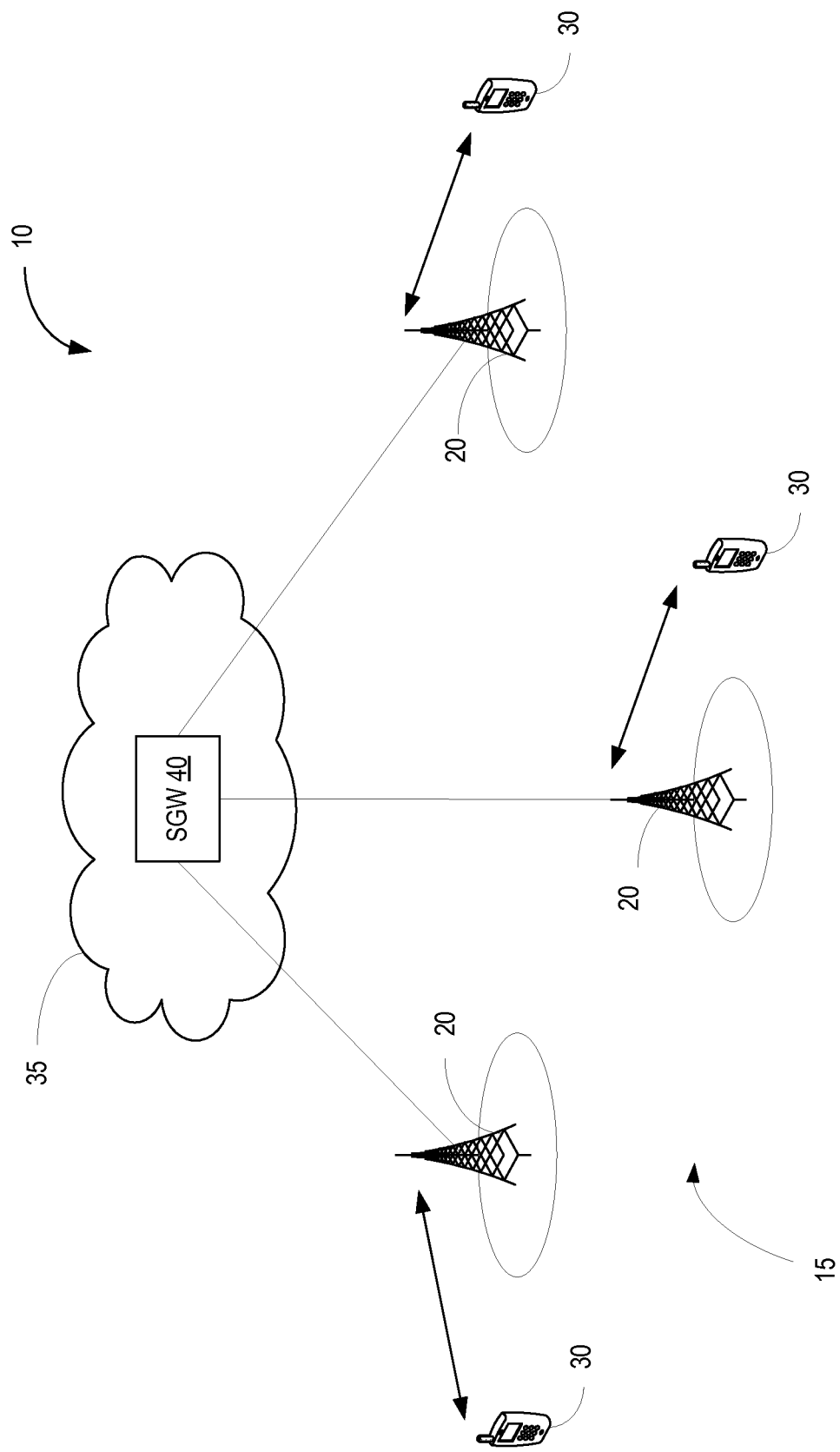
FIG. 1 illustrates an exemplary wireless communication network.

FIG. 1 illustrates an exemplary wireless communication network 10 which is configured to operate as herein described. The wireless communication network 10 may, for example, comprise a Long Term Evolution (LTE) network; however, those skilled in the art will appreciate that the principles herein described may be used in other types of networks, including Wideband Code Division Multiple Access (WCDMA) networks, WiFi networks and other wireless local area networks (WLANs), and Worldwide Interoperability for Microwave Access (WiMAX) networks.

The wireless communication network 10 comprises a radio access network (RAN) 15 including one or more base stations 20. In LTE, a base station 20 is also referred to an Evolved NodeB (eNodeB or ENB). Each base station 20 in the RAN 15 connects to a Serving Gateway (SGW) 40 in the core network 35 and provides service to wireless devices 30 within the cell served by the base station 20. The SGW 40 serves as a mobility anchor for the wireless devices 30 and routes packets to and from the wireless devices 30. In LTE, a wireless device 30 is also referred to as a user equipment (UE).

In exemplary embodiments of the present invention, a lightweight communication protocol is used for short data transmissions from a wireless device 30 to a serving base station 20. The lightweight communication protocol reduces signaling overhead for uplink transmissions and eliminates unnecessary protocol layers. The lightweight communication protocol is suitable for machine-to-machine (M2M) communications in which data transmissions are infrequent and comprise small amounts of data in each transmission. Exemplary applications for the present invention comprise:

sensor networks where wireless devices 30 collect sensor data and transmit the sensor data periodically to a central server using the lightweight communication protocol;

metering applications where wireless devices 30 in a utility meter periodically send meter readings to a central server; and location tracking where wireless devices 30 are used to periodically send location data to a central server.

These applications are illustrative of the types of applications for M2M communications, and should not be construed as limiting.

In exemplary embodiments, a wireless device 30 configured for M2M applications is provisioned with a device identifier. The base station 20 associates the device identifier with a static tunnel between the base station 20 and the SGW 40. For example, the base station 20 may maintain a mapping table to lookup the tunnel associated with a device identifier. When data is received from the wireless device 30, the device identifier is used to map the received data to the associated tunnel. In some embodiments, the mapping table may also associate predefined headers for higher layer protocols with the device identifiers. These predefined headers may be appended to the application data to generate higher layer protocol packets.

To access the network 10 for a short data transmission, the wireless device 30 may use a reserved periodic uplink grant wherein the base station 20 uses a preconfigured Asynchronous Radio Network Temporary Identifier (A-RNTI) to periodically schedule uplink transmissions from the wireless device 30 on the Physical Uplink Shared Channel (PUSCH). The A-RNTI is allocated from a normal range. More than one wireless device 30 may share the same A-RNTI. The reserved periodic uplink grant assigns radio resources to the wireless device 30 to use for a short data transmission. If the wireless device 30 has data to send, it transmits the data on the assigned radio resources using the lightweight communication protocol as described below. The A-RNTI may be assigned and stored by the wireless device when it is initially provisioned. Alternatively, the A-RNTI may be transmitted by the base station 20 to the wireless device 30 over a control channel.

As an alternative, the wireless device 30 may use a random access procedure to access the network 10. In this case, the wireless device 30 sends a random access request including a random preamble to the base station 20 on a random access channel (RACH) when it has data to send. The wireless device 30 then monitors the Access Grant Channel (AGCH) for a response. The base station 20 may either accept or deny the random access request. If the base station 20 accepts the random access request, it transmits a random access response to the wireless device 30. The random access response identifies the wireless terminal 30 by including the random preamble received from the wireless device 30 in the random access response. The random access response also includes an uplink grant assigning radio resources. The wireless device 30 then transmits the data on the assigned radio resources using the lightweight communication protocol as described below.

Figure 2:
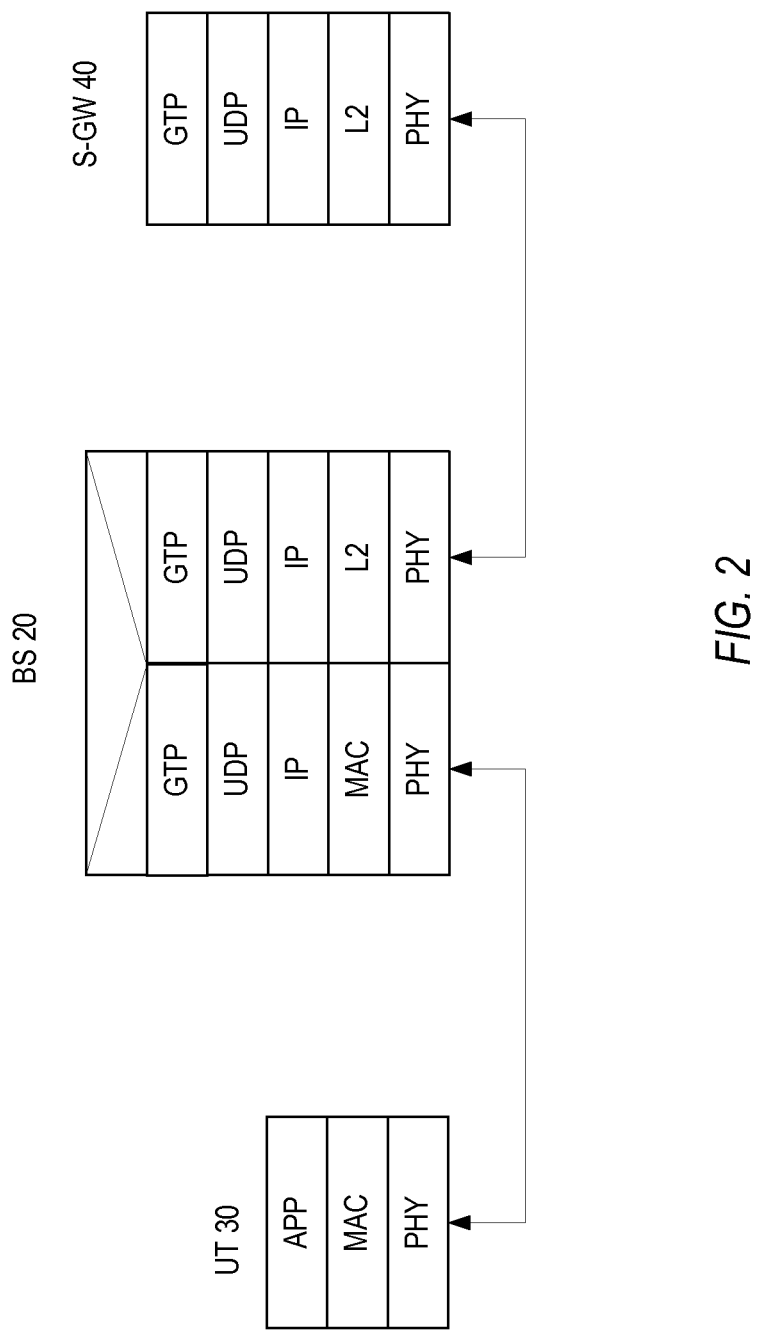
FIG. 2 illustrates an exemplary lightweight communication protocol according to an embodiment of the invention.

FIG. 2 illustrates an exemplary lightweight communication protocol for short data transmissions from a wireless device 30 to a serving base station 20 according to one exemplary embodiment. For short data transmissions, only three protocol layers are involved at the wireless device 30: the physical (PHY) layer, the medium access control (MAC) layer, and the application (APP) layer. The Radio Link Control (RLC) and Packet Data Convergence Protocol (PDCP) layers are omitted. The Internet Protocol and the Uniform Datagram Protocol (UDP), which each increase the signaling overhead, are not needed for transmitting small amounts of data from the wireless device 30 to the base station 20. Therefore, these protocols are not used for short data transmissions.

The APP layer contains one or more applications that generate data for transmission to the base station 20. Typically, the data transmissions required by an M2M application are infrequent and comprise small amounts of data. For such small data transmissions, the data is passed directly to the MAC layer, bypassing other protocol layers between the APP layer and MAC layer. The MAC layer generates a MAC packet data unit (PDU), also referred to herein as a medium access control packet, which includes a header and payload. As will be described in greater detail below, the header of the MAC PDU may include the device identifier for the wireless device 30 that is known to the base station 20. The payload of the MAC PDU carries the application data passed from the APP layer. The MAC PDU is then passed to the PHY layer and transmitted over a wireless channel to the base station 20.

The PHY layer and MAC layer are terminated at the base station 20. In exemplary embodiments, the lightweight protocol stack at the base station 20 further includes an IP layer, a UDP layer, and a GPRS Tunneling Protocol (GTP) layer above the MAC layer. The RLC and PDCP layers are omitted.

The PHY layer decodes the uplink transmission and passes the decoded data to the MAC layer. The MAC layer extracts the device identifier, if present, and application data from the MAC PDU, which is passed to the IP layer. The IP layer generates an IP packet and passes the IP packet to the UDP layer. The UDP layer in turn generates a UDP packet. The IP and UDP packets are generated by encapsulating the application data in pre-defined IP and UDP headers that are associated with the device identifier for the wireless device 30. The device identifier may be included in the MAC PDU in some embodiments. In other embodiments, the device A-RNTI in the periodic scheduling grant serves as the device identifier. In either case, the device identifier is used to determine the appropriate IP and UDP headers to append. The predetermined IP and UDP headers include the destination network address of the destination device, which is typically a M2M server. The IP/UDP packet is passed to the GTP layer, which encapsulates the IP/UDP packet in a GTP packet and transmits the GTP packet towards the SGW 40 through a pre-defined tunnel associated with the device identifier. The data transmission from the base station 20 to the SGW 40 uses conventional protocols.

Figure 3:
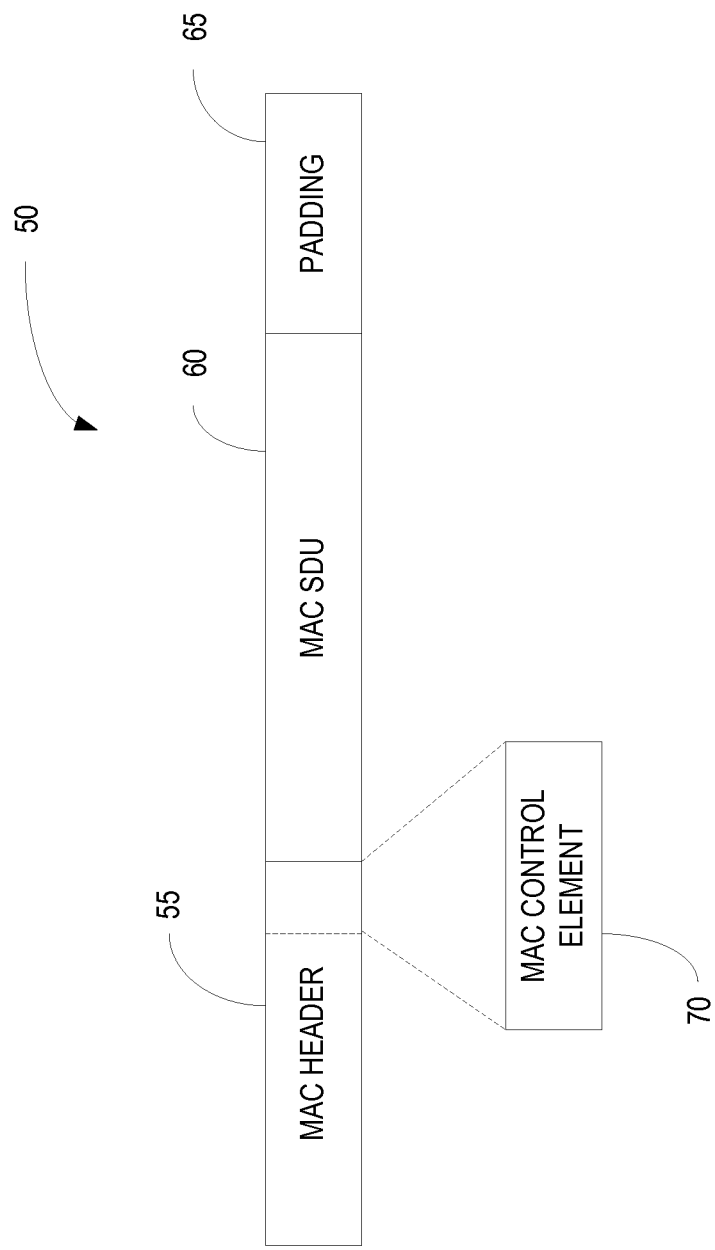
FIG. 3 illustrates an exemplary medium access control packet data unit (MAC PDU) used in some embodiments.

FIG. 3 illustrates an exemplary MAC PDU 50. The MAC PDU includes a MAC header 55, MAC signaling data unit (SDU) 60, and padding 65. The MAC header 55 in some embodiments includes a new information element (IE) referred to as the MAC Control Element (MCE) 70. The MCE 70 contains the device identifier that is associated with a predetermined tunnel and predefined IP/UDP headers. The MAC SDU 60 comprises the payload and carries the application data.

Figure 4:
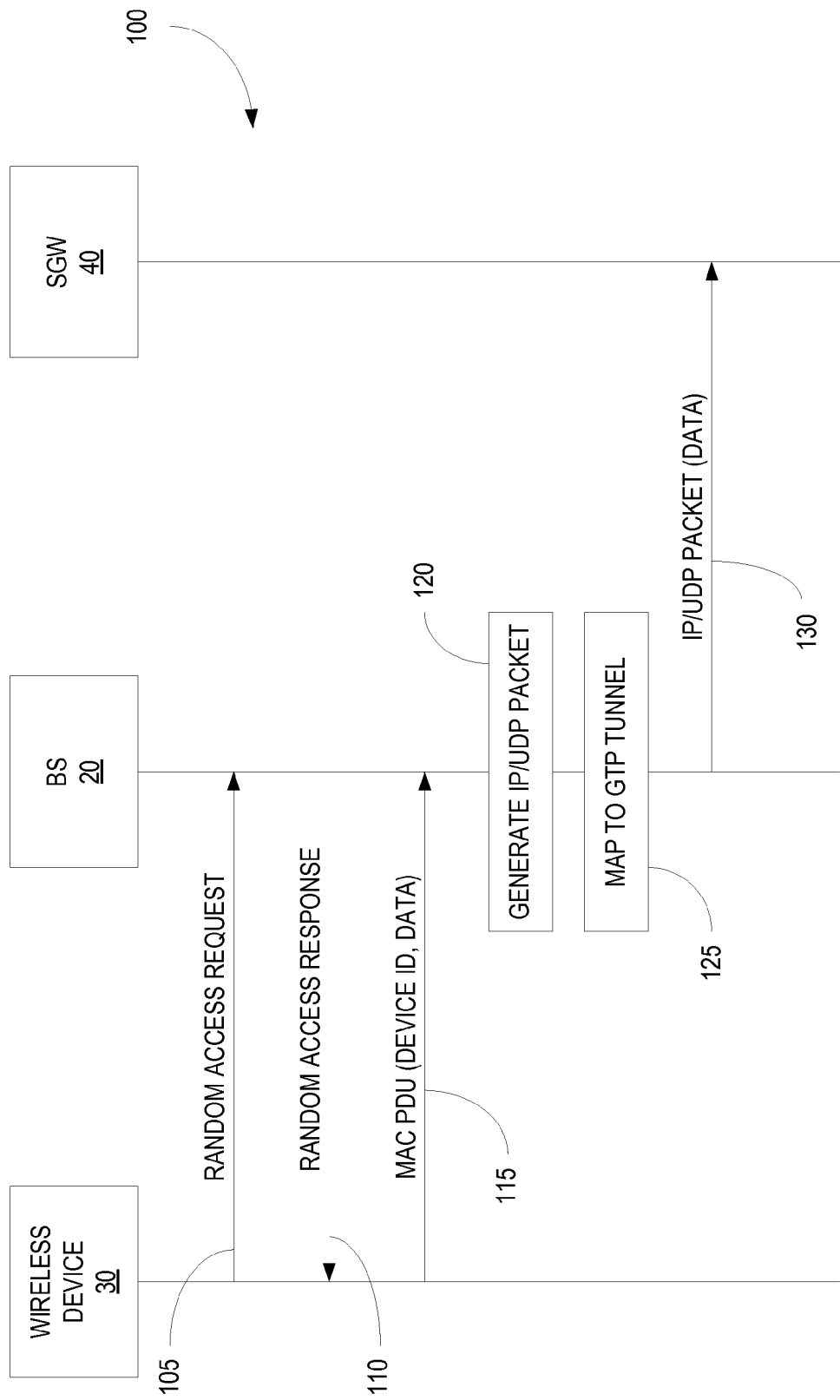
FIG. 4 illustrates exemplary signaling for an uplink transmission according to one embodiment of the invention.

FIG. 4 illustrates a short data transmission method 100 according to a first exemplary embodiment. It is assumed that the wireless device 30 is preconfigured with a device identifier that is known to the base station 20. The base station 20 associates the device identifier with 1) a predefined IP header 55 and/or a predefined UDP header 55; and 2) a static GTP tunnel. When the wireless device 30 has data to send, it transmits a random access request to the base station 20 over a random access channel (RACH) (105). The random access request includes a random preamble selected by the wireless device 30. The base station 20 may either accept or reject the random access request. If the random access request is accepted, the base station 20 sends a random access response to the wireless device 30 (110). The random access response includes the preamble taken from the random access request and an uplink grant assigning radio resources for a short data transmission. Upon receipt of the random access response, the wireless device 30 generates a MAC PDU 50. The application data is contained in the MAC SDU 60. The header 55 of the MAC PDU 50 includes the device identifier of the wireless device 30 in the MCE 70. The MAC PDU 50 is then transmitted from the wireless device 30 to the base station 20 over the physical channel (115). The base station 20 extracts the application data and device identifier from the MAC PDU 50. The base station 20 then generates IP and/or UDP packets by appending the predefined headers to the application data (120). The base station 20 then maps the IP/UDP packet to a predetermined, static GTP tunnel associated with the device identifier (125) and forwards the IP/UDP packet to the SGW 40 through the selected GTP tunnel (130).

Figure 5:
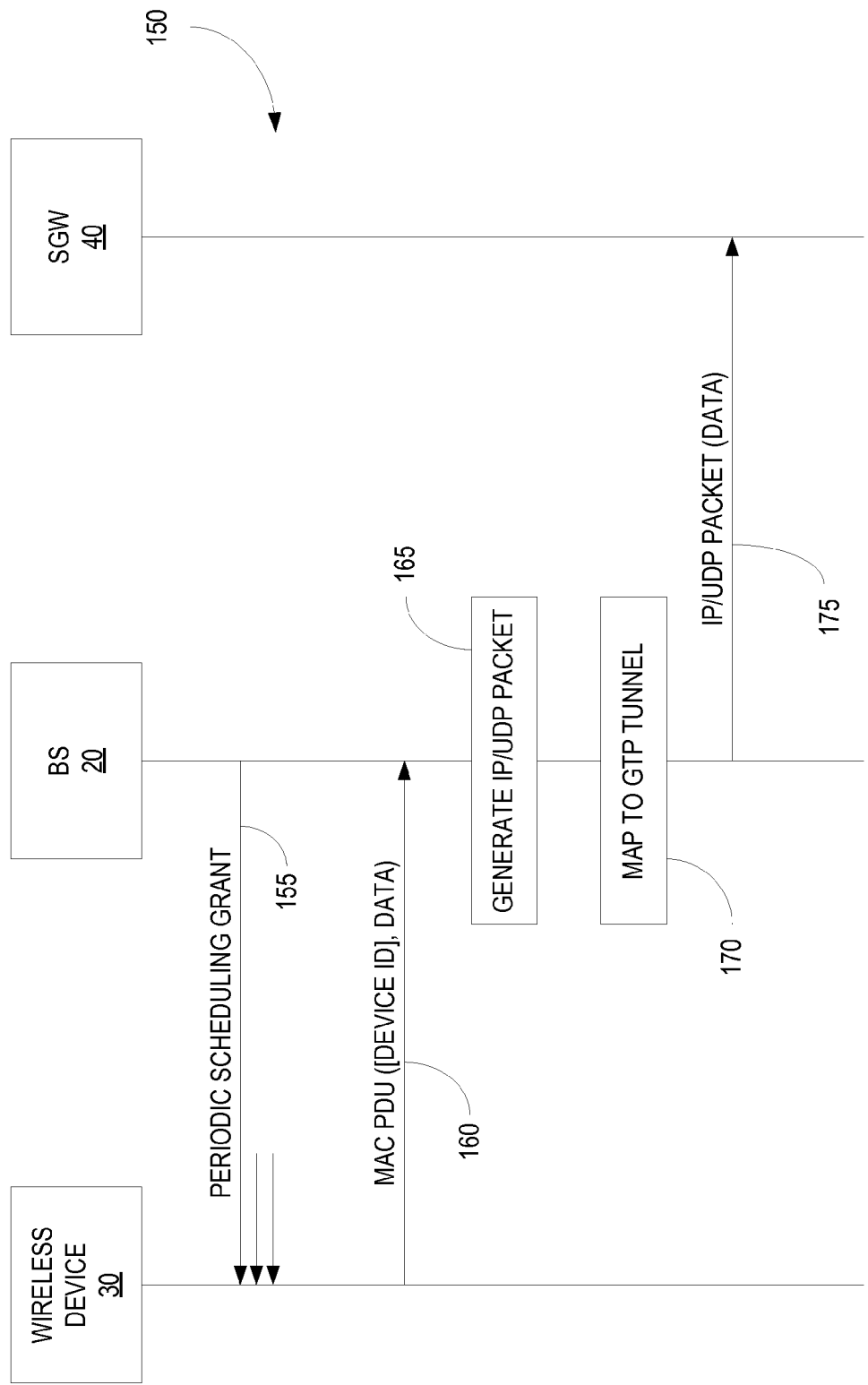
FIG. 5 illustrates exemplary signaling for an uplink transmission according to another embodiment of the invention.

FIG. 5 illustrates another method 150 for performing short data transmissions between a wireless device 30 and base station 20. This method 150 employs reserved periodic scheduling grants. It is assumed that the wireless device 30 is preconfigured with an A-RNTI that is used by the base station 20 for scheduling uplink grants to the wireless device 30. The wireless device 30 further includes a device identifier separate from the A-RNTI that is known to the base station 20. The base station 20 associates the device identifier with 1) a predefined IP header and/or a predefined UDP header; and 2) a static GTP tunnel. The base station 20 sends a reserved periodic scheduling grant to the wireless device 30 at some predetermined interval (155). The periodic scheduling grants include the preconfigured A-RNTI for the wireless device 30 that is being scheduled. As noted above, the A-RNTI may be assigned to a group of wireless devices 30. If one of the wireless devices 30 has data to send, it generates a MAC PDU 50 and sends the MAC PDU 50 to the base station 20 (160). The MAC PDU 50 includes the device identifier in the MCE 70 and the application data in the MAC SDU 60. The MAC PDU 50 is transmitted to the base station 20 over the physical channel. Upon receipt of the MAC PDU 50, the base station 20 generates IP and/or UDP packets as previously described (165) and maps the packets to a preconfigured GTP tunnel based on the device identifier (170). The packets are transmitted from the base station 20 to the SGW 40 through the predetermined GTP tunnel (175).

When reserved periodic uplink grants are used, it is not necessary to include the device identifier in the MAC PDU 50. Rather the A-RNTI in the scheduling grant may serve as the device identifier. In this case, the base station 20 can associate the preconfigured A-RNTI that is included in the reserved periodic uplink grant with a tunnel and with predefined headers. Thus, if a medium access control packet is received on the assigned resources, the base station 20 can map the A-RNTI in the uplink grant to the associated tunnel.

The A-RNTI specifies a short asynchronous transmission. A device identifier separate from the A-RNTI, however, can provide greater flexibility. For example, a separate device identifier may be used to specify the type of the wireless device 30 of the type of application that is sending the data.

Those skilled in the art will appreciate that, when the A-RNTI is used as the device identifier, wireless devices 30 sharing the same A-RNTI will be mapped to the same GTP tunnel. When an uplink grant is sent to a plurality of wireless devices 30 sharing the same A-RNTI, collisions may occur. Collision avoidance can be managed by scaling the number of uplink grants to the expected number of data transmissions from the wireless devices 30 sharing the same A-RNTI and by having the wireless devices 30 apply a random back-off. In the case of a collision, the wireless device 30 may temporarily store the data sent in the last transmission and retransmit the data at the next transmission opportunity. The wireless devices 30 may apply a random back-off to minimize the possibility of a second collision between the same two devices on the retransmission.

Figure 6:
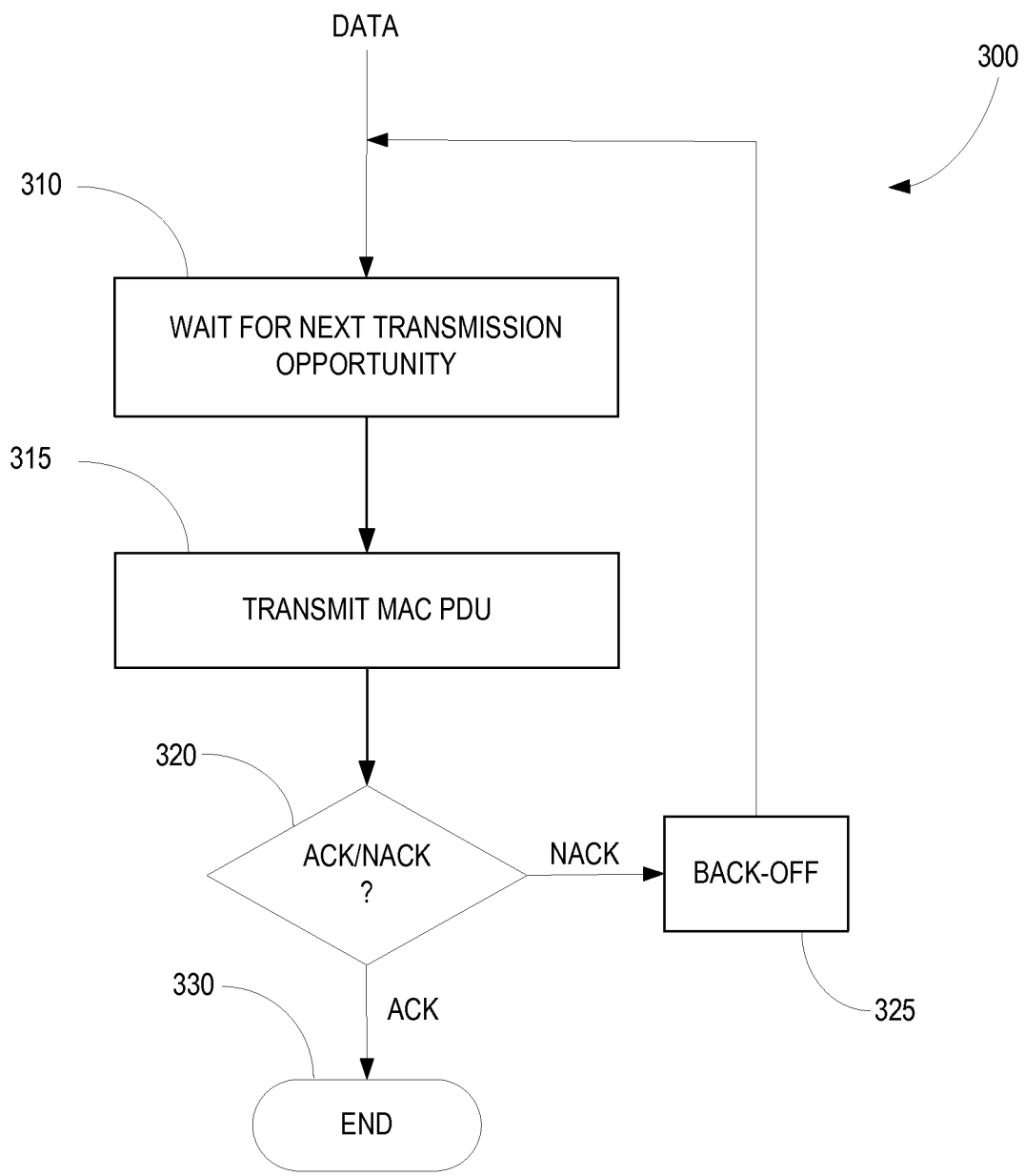
FIG. 6 illustrates an exemplary random back-off procedure used in some embodiment.

FIG. 6 illustrates an exemplary random back-off procedure 300 implemented by a wireless device 30 in the case of a collision. The procedure starts when the wireless device 30 has data to send, The wireless device 30 waits for the next transmission opportunity (block 310). At the next transmission opportunity, the wireless device 30 transmits the MAC PDU 50 (block 315). After the transmission, the wireless device 30 waits for an acknowledgement (block 320). The successful transmission of the MAC PDU 50 is acknowledged, the process ends (block 330). If the wireless device 30 receives a NACK indicating that the MAC PDU 50 was not successfully received, the wireless device 30 applies a random back-off (block 325). When the back-off period expires, the process repeats until the MAC PDU 50 is successfully transmitted or until a maximum number of transmission attempts have been made.

Figure 7:
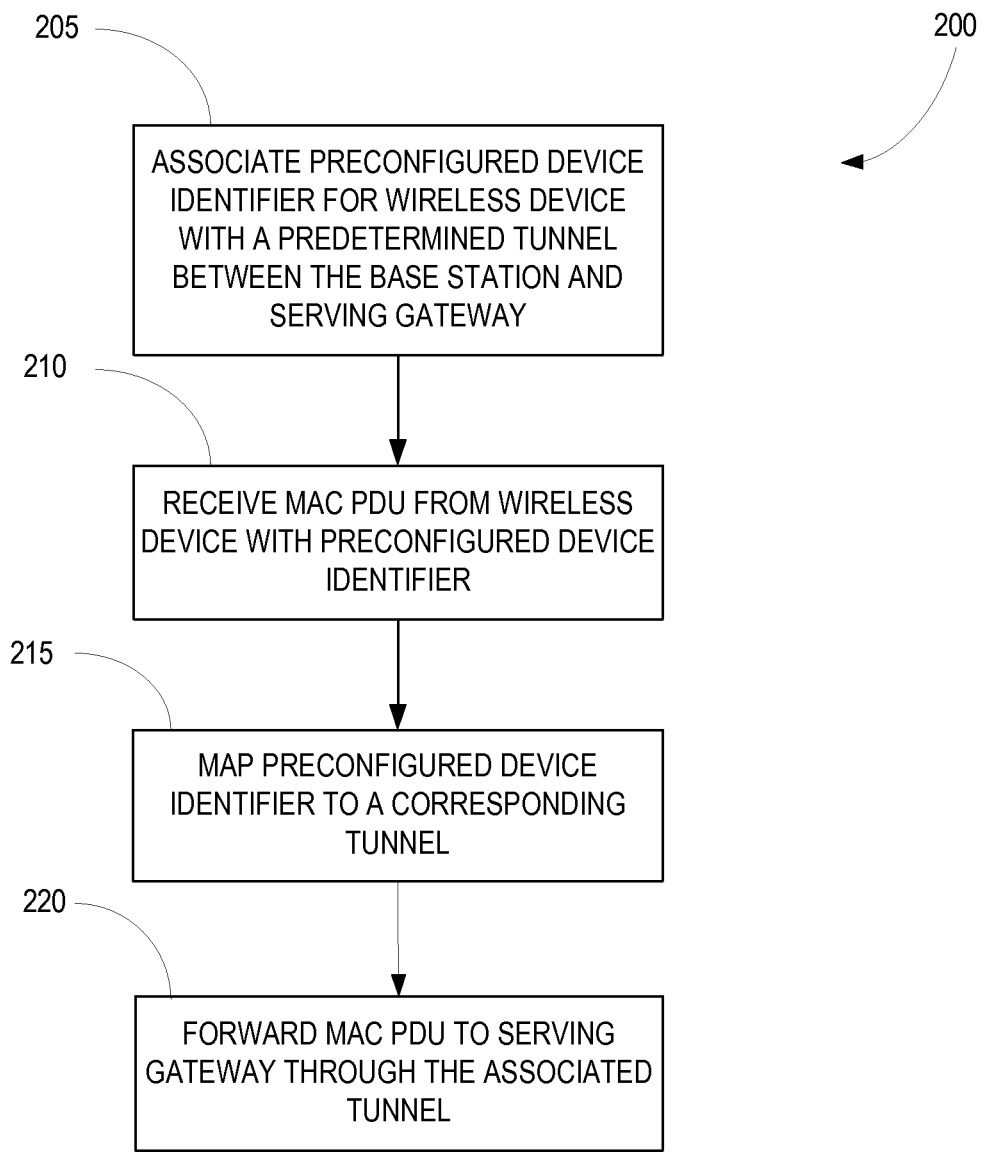
FIG. 7 illustrates an exemplary method implemented in a base station for receiving a short data transmission on an uplink channel.

FIG. 7 illustrates an exemplary method 200 implemented in a base station 20 for supporting short data transmissions by a wireless device 30. The base station 20 associates a device identifier for a wireless device 30 with a tunnel between the base station 20 and a SGW 40 (block 205). The base station 20 thereafter receives a MAC PDU 50 from the wireless device 30 (block 210). The MAC PDU 50 includes application data in the payload. The base station 20 maps the device identifier for the wireless device 30 to a corresponding tunnel between the base station 20 and serving gateway 40 (block 215). In some embodiments, the device identifier is included in the MAC PDU 50. In other embodiments, the base station 20 maps a preconfigured device identifier, e.g. A-RNTI, for the wireless device 30 that was included in an uplink grant transmitted by the base station 20 to the wireless device 30. The base station 20 then forwards the application data to the SGW 40 through the identified tunnel (block 220). In some exemplary embodiments, the application data extracted from the MAC PDU 50 is encapsulated in UDP and/or IP packets for transmission to the SGW 40 by appending predefined headers associated with the device identifier to the application data.

Figure 8:
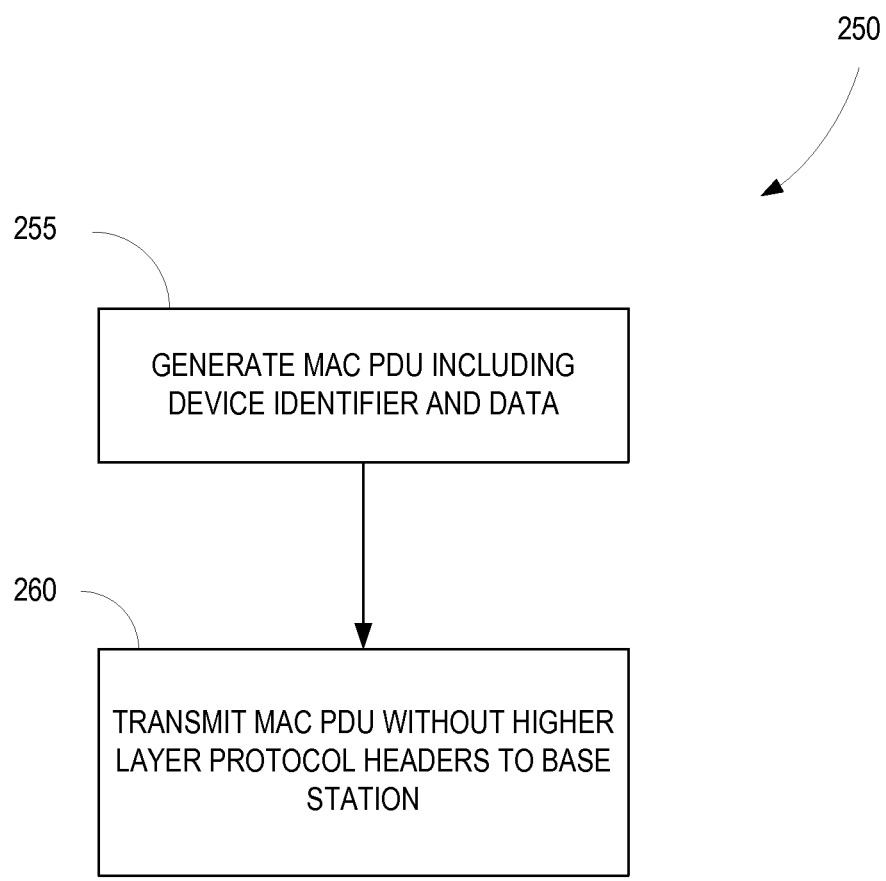
FIG. 8 illustrates an exemplary method implemented in a wireless device for performing a short data transmission on an uplink channel.

FIG. 8 illustrates an exemplary method 250 implemented by a wireless device 20 for sending a short data transmission to a base station 20. The wireless device 30 is preconfigured with a device identifier that is known to the base station 20. The wireless device 20 generates a MAC PDU 50 including the device identifier in the header 55 of the MAC PDU 50, and including the application data in the payload of the MAC PDU 50 (block 255). In embodiments using reserved periodic scheduling grants, the preconfigured device identifier can be omitted from the MAC PDU 50. In this case, the base station 20 uses the A-RNTI in the uplink grant as a device identifier for performing the mapping. The wireless device 30 then transmits the MAC PDU 50 without higher layer protocol headers to the base station 20 (block 260).

Figure 9:
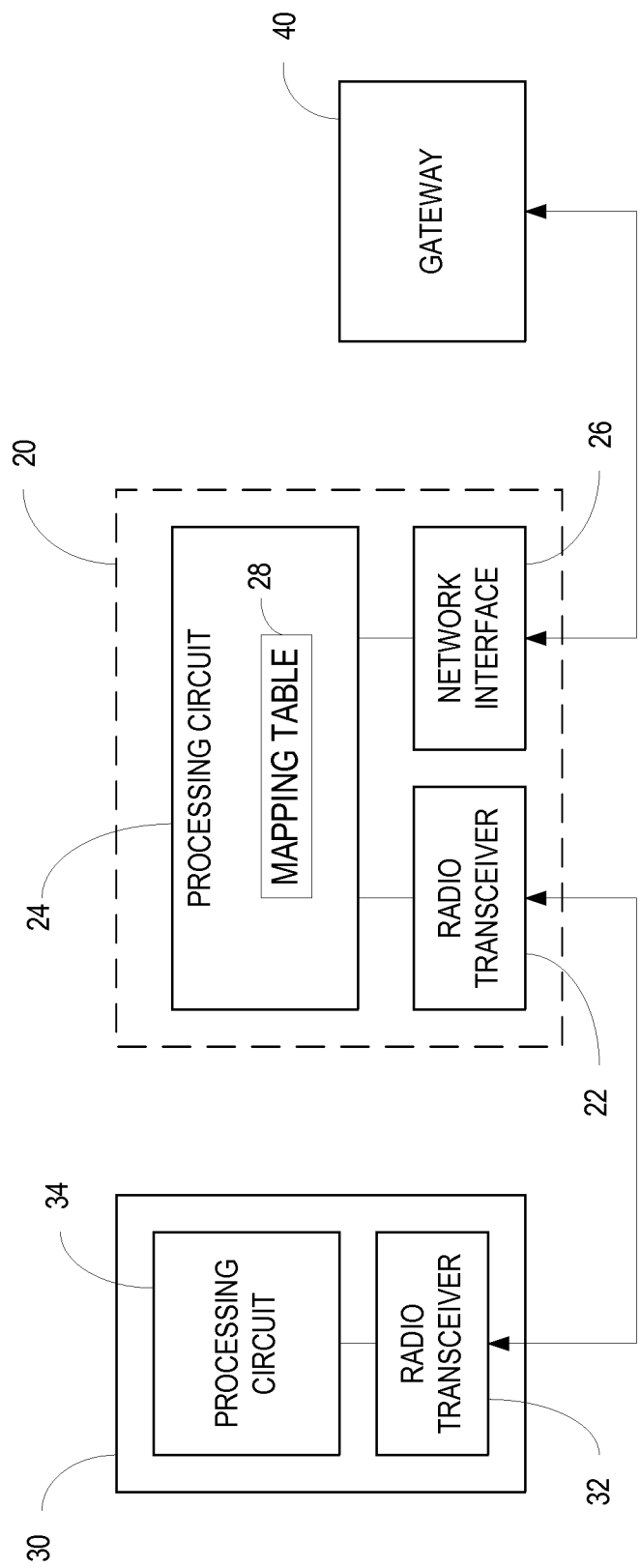
FIG. 9 illustrates the main functional components of an exemplary wireless device and base station.

FIG. 9 illustrates the main functional components of the wireless device 30 and base station 20. The wireless device 30 comprises a radio transceiver 32 for communicating with the base station 20 over a wireless channel, and a processing circuit 34 for processing the data transmitted and received by the wireless device 30. The radio transceiver may comprise a cellular transceiver that operates according to known standards, such as the LTE, WiMax, WiFi, or another wireless communication standard. The processing circuit 34 controls the operation of the wireless device 30 and processes the data transmitted and received by the wireless device 30. The processing circuit may comprise one or more processors, microcontrollers, hardware, firmware, or a combination thereof.

The base station 20 comprises a radio transceiver 22 for communicating with the wireless device 30 over a wireless channel, a network interface 26 for communicating with the SGW 40, and a processing circuit 24. The radio transceiver 22 may comprise a cellular transceiver as previously described. The network interface 26 may comprise a standard IP network interface, such as an Ethernet interface. The processing circuit 24 controls the operation of the base station 20 as herein described, and processes data transmitted to or from the wireless device 30. The processing circuit 24 stores a mapping table 28 that associates device identifiers contained in either the MAC PDU 50 or uplink scheduling grant with corresponding tunnels between the base station 20 and SGW 40 as previously described. The mapping table 28 may be stored in internal or external memory. The mapping table 28 is used to lookup the associated tunnel and predefined headers associated with the device identifier. The processing circuit 24 may comprise one or more processors, microcontrollers, hardware, firmware, or a combination thereof.

The present invention reduces the amount of overhead required for short data transmissions. Also, by eliminating unnecessary protocols form the data path for M2M communications, the complexity and cost of wireless device designated for M2M communications can be reduced.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method implemented by a base station in a wireless communication network for supporting small data transmissions by a wireless device, said method comprising:
    associating a preconfigured device identifier for the wireless device with a tunnel between the base station and a serving gateway;
    receiving, at the base station, a medium access control packet from the wireless device over a wireless communication channel via a lightweight communication protocol, said medium access control packet including application data transmitted by the wireless device for delivery to a destination device, said lightweight communication protocol comprising a protocol stack consisting essentially of an application layer, a media access control layer, and a physical layer;
    mapping the preconfigured device identifier of the wireless device to the associated tunnel; and
    forwarding a data packet containing said application data to said serving gateway through the associated tunnel.

2. The method of claim 1 wherein forwarding said application data to said serving gateway comprises:
    adding, based on the preconfigured device identifier, a predetermined header including a destination network address to said application data to create the data packet; and
    forwarding the data packet to the serving gateway through the associated tunnel.

3. The method of claim 1 wherein mapping the device identifier to the associated tunnel comprises:
    storing the preconfigured device identifier in a mapping table that associates one or more device identifiers for different wireless devices with corresponding tunnels between the base station and the serving gateway; and
    using the preconfigured device identifier to look up the associated tunnel in the mapping table.

4. The method of claim 1 wherein the data packet comprises an Internet Protocol packet and wherein the network address comprises an Internet Protocol address.

5. The method of claim 1 wherein the medium access control packet includes the preconfigured device identifier of the wireless device.

6. The method of claim 1 further comprising:
    sending a periodic scheduling grant to said wireless device, said periodic scheduling grant including the preconfigured device identifier;
    wherein said medium access control packet is received responsive to one of said periodic scheduling grants.

7. The method of claim 6 wherein the preconfigured device identifier in the periodic scheduling grant is used to map the received medium access control packet to the associated tunnel.

8. The method of claim 1 further comprising:
receiving a random access request from the wireless device; and
sending a random access response to the wireless device responsive to said random access request, said random access response including an uplink grant for the small data transmission;
wherein the medium access control packet is received from the wireless device responsive to said uplink grant.

9. A base station in a wireless communication network for supporting small data transmissions by a wireless device, the base station comprising:
a transceiver circuit configured to transmit and receive signals over a wireless communication channel; and
a processing circuit coupled to said transceiver circuit and configured to:
associate a preconfigured device identifier for the wireless device with a tunnel between the base station and a serving gateway;
receive a medium access control packet from the wireless device over a wireless communication channel via a lightweight communication protocol, said medium access control packet including application data transmitted by the wireless device for delivery to a destination device, said lightweight communication protocol comprising an application layer but not including a radio link control layer;
map the preconfigured device identifier of the wireless device to the associated tunnel; and
forward a data packet containing said application data to said serving gateway through tunnel.

10. The base station of claim 9 wherein the processing circuit is configured to forward said application data to said serving gateway by:
adding, based on the preconfigured device identifier, a predetermined header including a destination network address to said application data to create the data packet; and
forwarding the data packet to the serving gateway through the tunnel.

11. The base station of claim 9 wherein the processing circuit is configured to map the preconfigured device identifier to the associated tunnel by:
storing the preconfigured device identifier in a mapping table that associates one or more preconfigured device identifiers for different wireless devices with corresponding tunnels between the base station and the serving gateway; and
using the preconfigured device identifier to look up the associated tunnel in the mapping table.

12. The base station of claim 9 wherein the data packet comprises an Internet Protocol packet including a network address comprising an Internet Protocol address.

13. The base station of claim 9 wherein the medium access control packet includes the preconfigured device identifier.

14. The base station of claim 9 wherein the processing circuit is further configured to:
send a periodic scheduling grant to the wireless device, said periodic scheduling grant including the preconfigured device identifier;
wherein said medium access control packet is received responsive to one of said periodic scheduling grants.

15. The method of claim 14 wherein the preconfigured device identifier in the periodic scheduling grant is used to map the received medium access control packet to the associated tunnel.

16. The base station of claim 9 wherein the processing circuit is further configured to:
receive a random access request from the wireless device; and
send a random access response to the wireless device responsive to said random access request, said random access response including an uplink grant for the small data transmission;
wherein the medium access control packet is received from the wireless device responsive to said uplink grant.

17. A method of asynchronous small data transmission implemented by a wireless device in a wireless communication network, said method comprising:
sending application data to a destination device by:
generating a medium access control packet comprising a preconfigured device identifier and the application data, wherein the preconfigured device identifier is reserved for asynchronous small data transmissions to the destination device; and
transmitting the medium access control packet over a wireless communication channel to a serving base station via a lightweight communication protocol, said lightweight communication protocol comprising a protocol stack consisting essentially of an application layer, a media access control layer, and a physical layer;
wherein the preconfigured device identifier is associated with a tunnel between the serving base station and a serving gateway, the associated tunnel configured to forward the application data to the destination device.

18. The method of claim 17 further comprising:
sending a random access request message to said serving base station over a random access channel; and
receiving, responsive to said random access request message, a random access response message including an uplink grant assigning resources for the asynchronous small data transmission;
wherein the medium access control packet is transmitted over said assigned resources.

19. The method of claim 17 further comprising:
receiving a periodic scheduling grant to said wireless device, said periodic scheduling grant including the preconfigured device identifier;
wherein said medium access control packet is transmitted responsive to one of said periodic scheduling grants.

20. The method of claim 17 wherein the preconfigured device identifier comprises an Asynchronous Radio Network Temporary Identifier (A-RNTI).

21. A wireless device configured for asynchronous small data transmissions with a destination device, said wireless device comprising:
a transceiver circuit configured to transmit and receive signals over a wireless communication channel; and
a processing circuit coupled to said transceiver circuit and configured to:
generate a medium access control packet comprising a preconfigured device identifier and application data, wherein the preconfigured device identifier is reserved for asynchronous small data transmissions with the destination device; and
transmit the medium access control packet over the wireless communication channel to a serving base station via a lightweight communication protocol, said lightweight communication protocol comprising a protocol stack consisting essentially of an application layer, a media access control layer, and a physical layer;

wherein the preconfigured device identifier is associated with a tunnel between the serving base station and a serving gateway, the associated tunnel configured to forward the application data to the destination device.

22. The wireless device of claim 21 wherein the processing circuit is further configured to:

send a random access request message to said serving base station over a random access channel; and receive, responsive to said random access request message, a random access response message including an uplink grant assigning resources for the asynchronous small data transmission;

wherein the medium access control packet is transmitted over said assigned resources.

23. The wireless device of claim 21 wherein the processing circuit is further configured to:

receive a periodic scheduling grant from the serving base station, said periodic scheduling grant including the preconfigured device identifier;

wherein said medium access control packet is transmitted responsive to one of said periodic scheduling grants.

24. The wireless device of claim 21 wherein the preconfigured device identifier comprises an Asynchronous Radio Network Temporary Identifier (A-RNTI).

* * * * *